Figure 1:
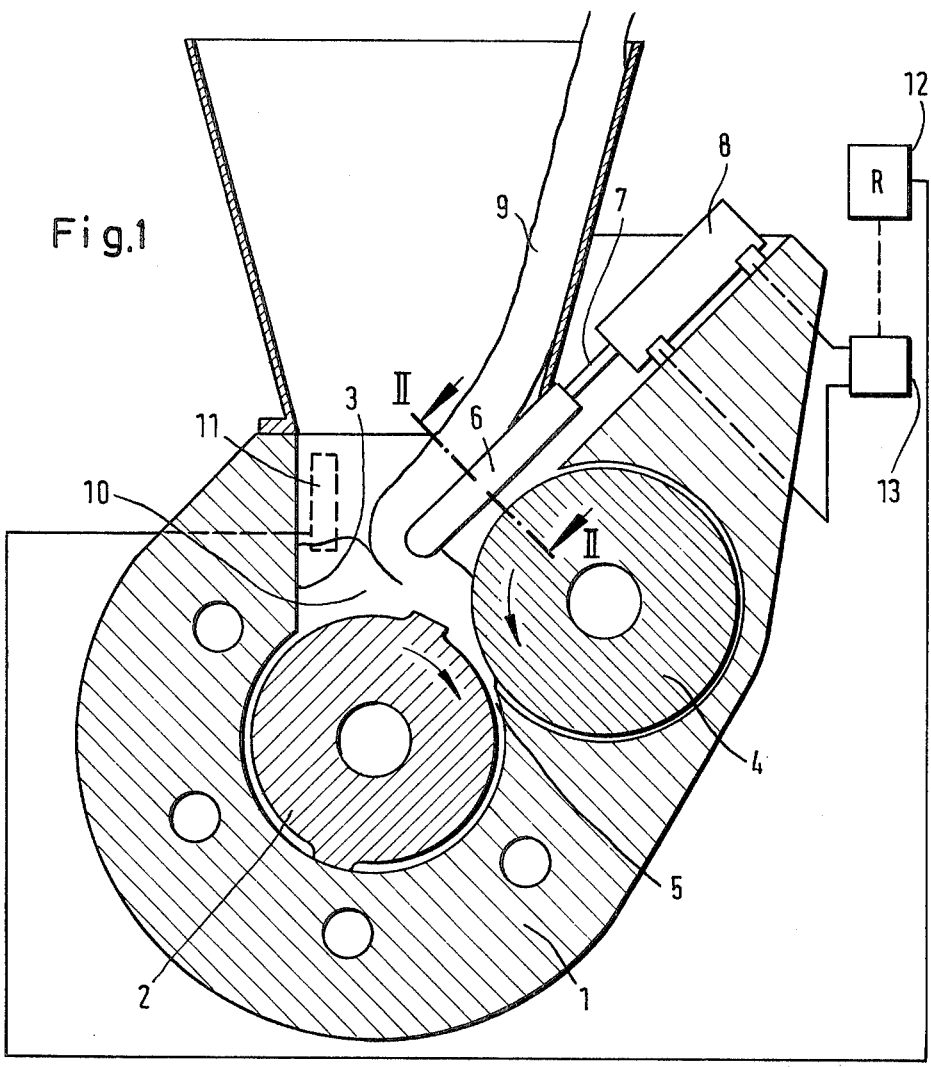

United States Patent [19]

Anders

[11] 4,247,272
[45] Jan. 27, 1981

[54] METHOD OF AND APPARATUS FOR THE CONTROLLED FEEDING OF A QUANTITY OF MATERIAL INTO THE INTAKE OPENING OF AN EXTRUDER FOR PROCESSING RUBBER OR PLASTICS MATERIAL

[75] Inventor: Dietmar Anders, Hanover, Fed. Rep. of Germany

[73] Assignee: Hermann Berstorff Maschinenbau GmbH, Hanover, Fed. Rep. of Germany

[21] Appl. No.: 971,592

[22] Filed: Dec. 20, 1978

[30] Foreign Application Priority Data

Dec. 27, 1977 [DE] Fed. Rep. of Germany ....... 2758267

[51] Int. Cl.³ .......................... B29B 5/04; B29F 3/02
[52] U.S. Cl. ...................................... 425/147; 222/56; 222/64; 264/40.4; 366/132; 366/142; 366/151; 366/153; 425 174.2; 425/204
[58] Field of Search ................. 264/176 R, 40.7, 40.4; 366/132, 142, 151, 153; 222/56, 64; 425/201, 204, 209, 174.2, 145, 147, 148, 140

[56] References Cited

U.S. PATENT DOCUMENTS

| | | | |
|---|---|---|---|
| 2,221,327 | 11/1940 | Rhodes | 425/147 |
| 3,225,963 | 12/1965 | Arpajian | 222/56 |
| 3,360,824 | 1/1968 | Schippers | 264/102 |
| 3,632,244 | 1/1972 | Sturgeon et al. | 425/141 |
| 3,785,527 | 1/1974 | Brand | 222/56 |
| 3,858,857 | 1/1975 | Ulm | 425/145 |

Primary Examiner—Jeffery R. Thurlow
Attorney, Agent, or Firm—Schwartz, Jeffery, Schwaab, Mack, Blumenthal & Koch

[57] ABSTRACT

A method and apparatus for controlling the feed of pieces of rubber or plastics material into the intake opening of an extruder where a feed roller has a control slide mounted thereabove which can be moved to increase or decrease the area of the surface of the roller which engages the material and thus the rate of material intake. Sensing means are provided to indicate to control means the level of material in the intake opening, the control means then operating the control slide to adjust the rate of intake of material.

2 Claims, 2 Drawing Figures

METHOD OF AND APPARATUS FOR THE CONTROLLED FEEDING OF A QUANTITY OF MATERIAL INTO THE INTAKE OPENING OF AN EXTRUDER FOR PROCESSING RUBBER OR PLASTICS MATERIAL

The invention relates to a method of and apparatus for controlled feeding of a quantity of material into the intake opening of an extruder for processing rubber or plastics material and having an intake opening with a feed-in roller disposed therein.

U.S. Pat. No. 3 785 527 discloses apparatus for the controlled feeding of pieces of material into the intake opening of an extruder, wherein the intake opening is divided into two sections by a barrier wall and wherein excess material; which the screw cannot immediately remove from the filling zone, passes from a first of the sections into and collects in a chamber, under atmospheric pressure, forming a second of the sections. When this chamber is full and a piston therein reaches its upper limit position due to the upward pressure of the material, the supply of material to the first section is stopped and the material which has collected in the pressure chamber is conveyed back towards the screw by means of the piston. When the pressure chamber has thus been emptied, the supply of material to the first section of the intake opening is resumed. Apparatus of this kind certainly fulfils its purpose but is complex and expensive to construct. The danger also exists that some material may remain permanently in the vicinity of the piston and become scorched there.

The invention has among its objects to provide a method of and apparatus for feeding material to be processed in a controlled manner to an extruder independently of the cross-section of the feed strip. In particular, the aim is to ensure that a feed-in roller disposed in the intake opening only draws as much material into the extruder as can be processed by the extruder, i.e. drawn in, and discharged by the screw.

According to one aspect of the invention, there is provided a method for the controlled feeding of pieces of rubber or plastics material into an intake opening of an extruder, the intake opening having a feed-in roller dispersed therein, comprising sensing the level in the intake opening of the material to be processed and altering the effective working surface area of the feed roller to alter the rate of material intake in dependence upon the sensed level.

According to a further aspect of the invention, there is provided apparatus for the controlled feeding of pieces of rubber or plastics material into an intake opening of an extruder comprising a feed-in roller disposed in the intake opening and a reciprocable control slide disposed horizontally or inclined above the feed roller in the intake opening and effective to alter the effective working surface area of the feed roller to alter the rate of material feed thereby.

The positioning of the slide above the feed roller may be effected manually or automatically in dependence upon the level of the core of material in the intake opening, which is established by any desirable sensing means, such as for example photocells, ultrasonic scanning means or even a mechanical scanning device.

By altering the effective surface of the feed roller the draw-in force is reduced in proportion to the area of the surface of the feed roller which is in contact with the material. In this way only that amount of material is drawn into the extruder which can be processed without an excessively large core of material being formed in the intake opening, which would then lead to failures in the supply of material. This step ensures that the working surface area of the feed roller effecting material intake is varied and thus the quantity of material drawn in is also varied.

If, for example, the slide extends over the feed roller almost entirely, then the working surface area of the feed roller effecting intake is considerably reduced and the intake of material is correspondingly reduced.

Above all, however, the material strip flowing into the intake opening is prevented from being drawn further into the gap between the feed roller and the extruder screw. This causes the core of material collected above the screw to be reduced because the material is now drawn from this core into the screw. When the material core has attained normal size, the slide is moved away from the feed roller, i.e. the material strip hanging into the intake opening is engaged by the feed roller once more, drawn into the gap between the feed roller and the screw and new material enters the extruder.

Figure 2:
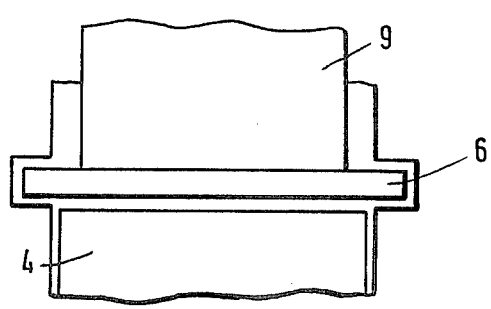

The invention is diagrammatically illustrated by way of example in the accompanying drawings, in which:

FIG. 1 is a cross-section through an extruder in the vicinity of its intake opening and showing a feed roller and control slide of apparatus according to the invention; and FIG. 2 is a section through the slide and part of the feed roller taken on line II—II of FIG. 1.

Referring to the drawings, an extruder has a casing 1 with an extruder screw 2 disposed therein beneath an intake opening 3. A material feed roller 4 is mounted beside the screw 2 with a material intake gap 5 therebetween.

A control slide 6, disposed horizontally or inclined above the material feed roller 4, can be reciprocated by a pneumatic or hydraulic cylinder 8 by means of a piston rod 7.

If for example, in operation ultrasonic scanning means 11 disposed in the intake opening 3 signals that material is piling up, i.e. it is back filling so that a material store 10 is present, then in response to this signal, which is transmitted to control means 12, a pressure source 13 is activated to move the control slide towards the screw 2, whereby a strip 9 of material being fed into the intake opening 3 is forced away from the surface of the feed roller into said store, which results in the rate of in-feed of the strip 9 being slowed down by engagement with the store and with the surface of the control slide 6 and not being drawn in any further. This condition is maintained until the material store 10 is reduced to normal dimensions, which condition is again signalled by the ultrasonic scanning means 11. The control slide 6 is then retracted again and the strip 9 is fed by engagement with the surface of the feed roller 4 into the material store 10. This causes a renewed supply of material to the intake opening 3.

The method of the invention and the apparatus necessary for performing said method are particularly distinguished by a very simple and operationally reliable construction. By using this method it is possible to feed the extruder with material at a feed rate which is independent of the cross-section of the material strip and which corresponds to the intake capacity of the screw or the discharge of the extruder.

What is claimed is:

1. Apparatus for the controlled feeding of pieces of extrudable material into an intake opening of an extruder, comprising:
   (a) an extruder screw positioned at the bottom of said intake opening,
   (b) a feed roller disposed in said intake opening and having an effective working surface area exposed to material fed to said extruder through said intake opening, said extruder screw and feed roller being spaced to provide a gap therebetween,
   (c) a reciprocable control slide disposed above said feed roller and adapted to adjustably extend over said effective working surface area of said feed roller so as to vary said effective working surface,
   (d) means for sensing an excess store of material in said intake opening, said sensing means comprising a scanning means disposed in said intake opening above said extruder screw, said scanning means sensing the presence of a store of material in said intake opening, and thereafter signaling said control means, and
   (e) control means operated by said sensing means for controlling the position of said control slide,
   whereby the quantity of material drawn into the intake opening and contacting the working surface of said feed roll can be limited to only that amount of material which can be processed without an excessively large buildup of material in the intake opening.

2. The apparatus of claim 1 wherein said reciprocable control slide is operatively connected to a pressure device by means of which the slide can be extended or retracted to variably expose the effective working surface area of said feed roll, said pressure device being actuated by said control means in response to said sensing means.

* * * * *